(12) United States Patent
Hoffmann et al.

(10) Patent No.: US 9,297,121 B2
(45) Date of Patent: Mar. 29, 2016

(54) PROCESS FOR THE PRODUCTION OF BALLAST

(75) Inventors: Andreas Hoffmann, Pulheim (DE); Torsten Erwe, Odenthal (DE); Udo Maier, Pulheim (DE); Hans-Guido Wirtz, Leverkusen (DE); Thomas Kleiner, Odenthal (DE); Ralf Busch, Köln (DE)

(73) Assignee: Covestro Deutschland AG, Leverkusen (DE)

( * ) Notice: Subject to any disclaimer, the term of this patent is extended or adjusted under 35 U.S.C. 154(b) by 48 days.

(21) Appl. No.: 14/006,716

(22) PCT Filed: Mar. 21, 2012

(86) PCT No.: PCT/EP2012/054972
§ 371 (c)(1),
(2), (4) Date: Feb. 26, 2014

(87) PCT Pub. No.: WO2012/126936
PCT Pub. Date: Sep. 27, 2012

(65) Prior Publication Data
US 2014/0161526 A1 Jun. 12, 2014

(30) Foreign Application Priority Data

Mar. 24, 2011 (WO) ................ PCT/CN2011/000496

(51) Int. Cl.
*E01C 21/00* (2006.01)
*E01B 1/00* (2006.01)
*C08G 18/10* (2006.01)
*C08G 101/00* (2006.01)

(52) U.S. Cl.
CPC . *E01B 1/00* (2013.01); *C08G 18/10* (2013.01); *E01B 1/001* (2013.01); *C08G 2101/00* (2013.01)

(58) Field of Classification Search
USPC ............................ 404/72, 75; 238/2; 405/263
IPC ........................ E01B 1/001,27/00; E01C 21/00
See application file for complete search history.

(56) References Cited

U.S. PATENT DOCUMENTS

| | | | |
|---|---|---|---|
| 3,756,507 A * | 9/1973 | Hanig et al. ...................... 238/2 |
| 4,985,276 A | 1/1991 | Zeiss et al. |
| 5,372,844 A | 12/1994 | Ihle et al. |
| 6,133,481 A | 10/2000 | Singh et al. |
| 7,896,255 B2 * | 3/2011 | Frenzel ............................. 238/2 |
| 8,118,052 B2 * | 2/2012 | Swab et al. ................... 137/208 |
| 8,715,778 B2 * | 5/2014 | Hoffmann et al. ............ 427/136 |
| 8,876,014 B2 * | 11/2014 | Zhang et al. ...................... 238/2 |
| 8,938,887 B2 * | 1/2015 | Bruning et al. .................... 34/67 |
| 2007/0172590 A1 * | 7/2007 | Hoffmann et al. ............ 427/212 |
| 2009/0152368 A1 * | 6/2009 | Frenzel ............................. 238/2 |
| 2010/0140367 A1 | 6/2010 | Pawlik et al. |
| 2014/0300015 A1 * | 10/2014 | Erwe et al. ...................... 264/35 |

FOREIGN PATENT DOCUMENTS

| | | |
|---|---|---|
| CN | 1246873 A | 3/2000 |
| CN | 101370983 A | 2/2009 |
| CN | 101878339 A | 11/2010 |
| DE | 86201 A | 7/1971 |
| DE | 2063727 A1 | 8/1972 |
| DE | 2305536 A1 | 8/1974 |
| DE | 3821963 A1 | 1/1990 |
| DE | 3941142 A1 | 6/1991 |
| DE | 19651755 A1 | 6/1998 |
| DE | 19711437 A1 | 10/1998 |
| DE | 19811838 A1 | 9/1999 |
| EP | 1979542 A1 | 10/2008 |
| EP | 2150652 A1 | 2/2010 |
| EP | 2 500 472 * | 9/2012 |
| JP | 8157552 | 6/1996 |
| WO | WO-2009068169 A1 | 6/2009 |
| WO | WO-2011131621 A1 | 10/2011 |
| WO | 2012/126145 * | 9/2012 |

OTHER PUBLICATIONS

International Search Report for PCT/EP2012/054972 mailed Jul. 4, 2012.

* cited by examiner

*Primary Examiner* — Gary Hartmann
(74) *Attorney, Agent, or Firm* — Drinker Biddle & Reath LLP

(57) ABSTRACT

A process for the production of ballast for railway track laying, road construction, dam construction and bank protection, wherein ballast stones are spread out to form ballast and a reaction mixture for the preparation of a polyurethane foam, produced from components by a low-pressure process, is applied between the spread ballast stones.

5 Claims, No Drawings

PROCESS FOR THE PRODUCTION OF BALLAST

RELATED APPLICATIONS

This application is a national stage application (under 35 U.S.C. §371) of PCT/EP2012/054972, filed Mar. 21, 2012, which claims benefit of PCT Application No. PCT/CN2011/000496, filed Mar. 24, 2011, which is incorporated by reference herein.

The present invention relates to a process for the production of ballast, which has a high stability and long service life, for railway track laying, road construction, dam construction and bank protection, said ballast consisting of ballast stones and polyurethane foams based on a reaction mixture of polyisocyanates and compounds with isocyanate-reactive groups.

BACKGROUND OF THE INVENTION

The demand for ballast used in railway track laying and road construction has increased sharply in recent years. One reason for this is certainly the general increase in population mobility and freight traffic. Rail traffic, in particular, comprises an ever-increasing proportion of high-speed trains with a large axle load. The enormous displacement forces they cause are transmitted via the rails to the sleepers and from there to the ballast. The stone formation changes over time and individual ballast stones become distorted, shifted and rounded, so the position of the tracks is changed and cost-intensive and time-consuming repair work has to be carried out at regular intervals.

Various methods of consolidating ballast with the incorporation of plastics have already been described in the past (DD-A 86201, DE-A 3941142, DE-A 19711437, DE-A 19651755, DE-A 3821963, DE-A 19811838).

DE-A2063727 describes a method of reducing lateral track buckling due to lateral displacement forces. In this case the binder is sprayed onto the ballast bed in the form of a high-viscosity plastic and the ballast stones are adhesively bonded together at the points of contact. A possible alternative is 2-dimensional adhesive bonding of the ballast stones by injection of the binder in the form of a 2-component synthetic resin.

DE-A 2305536 describes a method of raising railway sleepers and road surfaces by the introduction of a swelling agent, which then solidifies. The swelling agent is e.g. a multicomponent plastic such as polyurethane foam. The liquid plastic is applied through a hole in the sleeper using a filling probe.

JP-A 8157552 describes the preparation of polyurethane resins which cure in the presence of moisture and are used to stabilize piles of stones. The polyurethane resins are prepared using aromatic polyisocyanates, monofunctional poly-ethers and amino-initiated polyethers and applied by means of spraying processes.

EP-A 1979542 describes a method of consolidating ballast, wherein ballast stones are spread out to form ballast and reaction mixtures of isocyanate components and polyol components for the preparation of polyurethane foams are applied between the spread ballast stones.

EP-A 2150652 describes a process for the partial or complete foaming in situ in the scaffold of a ballast bed, wherein the reactive components are fed into a high-pressure mixing head, where they are mixed, and the free-flowing reactive mixture discharged from the high-pressure mixing head is applied to the surface of the ballast scaffold.

A common feature of the methods described above is that they produce ballast which can only be stabilized unselectively with the aid of plastics. Furthermore, in some cases the methods described rely on a relatively complicated application technique, or the operation is carried out under high pressure in order to mix the reaction components thoroughly. In particular, there is no possibility of a flexible variation in the proportion of catalyst or activator in order to adapt to a change in ballast depth, porosity or temperature. In this application it is typical to use chemical systems which have extremely different proportions of the components in the mixture, e.g. 1 part catalyst: 100 parts polyol component. In the high-pressure technique these cannot be adjusted to other proportions with sufficient speed and accuracy. Alternatively, it would be necessary to have high-pressure mixing heads of much more complex design and to accommodate additional storage containers in the already restricted space on the track wagon from which the application is made.

BRIEF SUMMARY OF THE INVENTION

The object of the present invention was to provide an improved process for the production of ballast which allows a faster working rate on the track and requires less complex equipment. The problem here is that the amount of catalyst or activator, which is used in a very small proportion compared with the other reactive components of the foam system, has to be adapted to rapidly changed conditions, e.g. in curve cambers or at points, or to other ballast compositions or different infrastructures, e.g. signalling equipment. Similar changes in external conditions also demand rapid changes to the activator and catalyst system in road construction, dam construction or bank protection. Such changes must not cause stoppages or delays in the progress of the application, e.g. from one sleeper to the next.

Surprisingly, this object could be achieved by the provision of the process according to the invention described below.

DETAILED DESCRIPTION OF THE INVENTION

The invention provides a process for the production of ballast for railway track laying, road construction, dam construction and bank protection, wherein
1) ballast stones are spread out to form ballast and
2) a reaction mixture for the preparation of a polyurethane foam, produced from components by the low-pressure process, is applied between the spread ballast stones.

Preferably, the reaction mixture is applied using several low-pressure mixing heads at the same time.

The advantages of the process according to the invention are that very small amounts can be mixed with large amounts without having to carry out additional process steps or use additional apparatuses.

The components for preparing the polyurethane foams are used in a mixing ratio that allows homogeneous mixing of the components, especially when using low-pressure machines. The use of low-pressure machines also makes it possible to process quick-reacting PUR systems and hence affords an economic process. In particular, it is possible to adapt quickly to changes in the flow paths that become necessary due to changes in the external conditions of the track bed, without requiring additional intermediate storage containers. Moreover, the low-pressure technique allows parts of simpler design.

In addition, the processing properties of the PUR system can be optimized to requirements by using the raw materials described in greater detail below. Thus, one possible application method is a partial foaming of the ballast using pouring technology. Furthermore, the mechanical properties of the polyurethane foams used can be varied within wide limits. The advantages of the PUR foams used are good compression hardnesses (at 10% compression set) (≥1.0 kPa) and tensile strengths (≥0.1 MPa) coupled with a low permanent set (PS (40%, 25° C., 5 min)≤0.01%).

The polyurethane foam located between the ballast stones is preferably obtainable from a) one or more isocyanate compounds from the group comprising polyisocyanates with an NCO content of 28 to 50 wt. % and NCO prepolymers with an NCO content of 10 to 48 wt. %, consisting of polyisocyanates with an NCO content of 28 to 50 wt. % and polyetherpolyols with a hydroxyl number of 6 to 112, polyoxyalkylenediols with a hydroxyl number of 113 to 1100 or alkylenediols with a hydroxyl number of 645 to 1850, or mixtures thereof, and b) a polyol component consisting of one or more polyetherpolyols with a hydroxyl number of 6 to 112 and a functionality of 1.8 to 8, in the presence of c) 0 to 26 wt. %, based on reaction components b) to g), of one or more chain extenders with a hydroxyl or amine number of 245 to 1850 and a functionality of 1.8 to 8, d) 0.05 to 5 wt. %, based on reaction components b) to g), of one or more blowing agents, e) 0 to 5 wt. %, based on reaction components b) to g), of one or more catalysts, f) 0 to 50 wt. %, based on reaction components b) to g), of one or more fillers and g) 0 to 25 wt. %, based on reaction components b) to g), of one or more auxiliary substances and/or additives, the index of the reaction mixture ranging from 70 to 130.

As regards processing, the reaction mixture for preparation of the polyurethane foam is adjusted so that it can be used with the low-pressure technique, e.g. by the pouring process. For example, a partial foaming of the ballast can be effected by specific adjustment of the reactivity of the reaction mixture. Such a partial foaming makes it possible on the one hand selectively to strengthen the ballast in particularly stressed regions (e.g. curves, load dissipation regions) and on the other hand allows the uninhibited drainage of liquids such as water. The effect of an excessively slow reaction would be that the reaction mixture drained into the soil or marginal regions of the ballast bed. The effect of an excessively rapid reaction would be that the reaction mixture did not penetrate to a sufficient depth in the layers of bulk material. For example, for a track system with a ballast height of approx. 40 cm, the initiation time of the reaction mixture should be 1 to 20 seconds, preferably 5 to 10 seconds, and the solidification time (curing time) 15 to 45 seconds, preferably 15 to 30 seconds, longer solidification times being possible but uneconomic.

The polyurethane foam used should preferably have a compression hardness (at 10% compression set) of at least 1.0 kPa and a tensile strength of at least 0.1 MPa. Furthermore, it should preferably have a permanent set (PS) (40%, 25° C., 5 min) of at most 0.01% and a good stability to weathering and hydrolysis. The polyurethane foam used should also be distinguished by the smallest possible content of emissible and mobilizable ingredients.

In principle, the polyurethane foams can be produced in a variety of ways, e.g. by the one-shot process or the prepolymer process. In the one-shot process, all the components, e.g. polyols, polyisocyanates, chain extenders, blowing agents, catalysts, fillers and/or additives, are brought together and intimately mixed.

In the prepolymer process, the first step is to prepare an NCO prepolymer by reacting part of the polyol with all the polyisocyanate, after which the remainder of the polyol and any chain extenders, blowing agents, catalyst, fillers and/or additives are added to the resulting NCO prepolymer and intimately mixed.

A particularly preferred process in terms of the present invention is one in which the components are mixed in at least two, particularly preferably three, mass fluxes in a stirred tank whose size is adapted to the required mixing time and materials to be mixed. Alternatively, the mixture can be prepared by means of a static mixer or a friction mixer.

1. Isocyanate component as one mass flux.
2. Polyol component as a second mass flux, into which all the remaining constituents, other than the catalyst or activator, have been mixed, e.g. one or more polyol components, and chain extenders, blowing agents, fillers, auxiliary substances and/or additives which are optionally to be used concomitantly. (This mixture is not absolutely necessary because components which are compatible with the polyisocyanate component and do not react therewith can also be incorporated into said polyisocyanate component.)
3. Catalyst(s) or activator(s) (catalyst component) as a third mass flux.

The three components (isocyanate component, polyol component and catalyst component) are mixed under a pressure of 1 to 50 bar, preferably of 2 to 20 bar (low-pressure range).

It is preferable to use three storage containers (two large (for isocyanate and polyol components) and one small (for catalyst component), which are carried along on the track wagon. From these three containers (or only two in certain cases which do not require a catalyst) the amounts of components for the reactive mixture can be adjusted easily and rapidly during the application, by means of the low-pressure technique, as the need arises (changing conditions of the ballast bed and/or the check rail, e.g. curve cambers, points and other infrastructure conditions, i.e. deviations from the regulation superstructure).

The reaction mixture formed by means of the low-pressure technique is preferably applied to the ballast stones by the pouring process and flows towards the bottom of the ballast bed under gravity, the feeding, proportioning and mixing of the individual components or component mixtures being effected by means of a low-pressure device. The amount of mixture introduced is generally proportioned no that the polyurethane foam has a free foam density of 20 to 800 kg/m$^3$, preferably of 30 to 600 kg/m$^3$ and particularly preferably of 50 to 300 kg/m$^3$. The starting temperature of the reaction mixture applied to the ballast stones is generally chosen in the range from 20 to 80° C., preferably from 25 to 40° C. The ballast stones are optionally dried and heated before the reaction mixture is introduced. Depending on the reaction components, the catalysts added and the temperature control, the solidification time of the foam (curing time) can be from 15 to 45 seconds, preferably from 15 to 30 seconds. Longer solidification times are possible but uneconomic.

The invention claimed is:

1. A process for the production of ballast for railway track laying, road construction, dam construction or bank protection, comprising
   (1) spreading ballast stones to form ballast and
   (2) applying between the spread ballast stones a reaction mixture for the preparation of a polyurethane foam, produced from components by a low-pressure process, wherein the reaction mixture is prepared in a pressure range of from 2 to 20 bar from components present in at least two component streams, and wherein the polyurethane foam has a compression hardness at a 10% compression set of at least 1.0 kPa and a tensile strength of at least 0.1 MPa; and
wherein the polyurethane foam is obtained from
a) one or more isocyanate compounds selected from the group consisting of polyisocyanates with an NCO content of 28 to 50 wt. % and NCO prepolymers with an NCO content of 10 to 48 wt. %, consisting of polyisocyanates with an NCO content of 28 to 50 wt. % and polyetherpolyols with a hydroxyl number of 6 to 112, polyoxyalkylenediols with a hydroxyl number of 113 to 1100 or alkylenediols with a hydroxyl number of 645 to 1850, and mixtures thereof, and
b) a polyol component consisting of one or more polyetherpolyols with a hydroxyl number of 6 to 112 and a functionality of 1.8 to 8, in the presence of
c) 0 to 26 wt. %, based on reaction components b) to g), of one or more chain extender with a hydroxyl or amine number of 245 to 1850 and a functionality of 1.8 to 8,
d) 0.05 to 5 wt. %, based on reaction components b) to g), of one or more blowing agent,
e) 0 to 5 wt. %, based on reaction components b) to g), of one or more catalyst,
f) 0 to 50 wt. %, based on reaction components b) to g), of one or more filler, and
g) 0 to 25 wt. %, based on reaction components b) to g), of one or more auxiliary substance and/or additive, wherein the index of the reaction mixture is from 70 to 130.

2. The process of claim 1 wherein the reaction mixture is applied by a low-pressure mixing head.

3. The process of claim 1 wherein the reaction mixture is prepared from an isocyanate component, a polyol component and a catalyst component in a low-pressure mixer, wherein the isocyanate component, the polyol component and the catalyst component are being fed into the low-pressure mixer in the form of a component stream.

4. The process of claim 1, wherein the polyurethane foam has a free foam density of 20 to 800 kg/m$^3$.

5. The process of claim 4, wherein the polyurethane foam has a free foam density of 50 to 300 kg/m$^3$.

* * * * *